United States Patent
Singhal

(10) Patent No.: US 11,272,321 B2
(45) Date of Patent: Mar. 8, 2022

(54) SYSTEMS AND METHODS FOR LOCATION AND MOVEMENT TRACKING USING GPS ENABLED CELL PHONES

(76) Inventor: Tara Chand Singhal, Torrance, CA (US)

(*) Notice: Subject to any disclaimer, the term of this patent is extended or adjusted under 35 U.S.C. 154(b) by 702 days.

(21) Appl. No.: 12/290,821

(22) Filed: Nov. 3, 2008

(65) Prior Publication Data

US 2010/0022255 A1    Jan. 28, 2010

Related U.S. Application Data

(60) Provisional application No. 61/137,038, filed on Jul. 26, 2008.

(51) Int. Cl.
| | | |
|---|---|---|
| H04W 24/00 | (2009.01) | |
| H04W 4/029 | (2018.01) | |
| G08G 1/00 | (2006.01) | |
| H04W 64/00 | (2009.01) | |
| H04W 8/24 | (2009.01) | |

(52) U.S. Cl.
CPC ............ *H04W 4/029* (2018.02); *G08G 1/20* (2013.01); *H04W 8/24* (2013.01); *H04W 24/00* (2013.01); *H04W 64/00* (2013.01)

(58) Field of Classification Search
CPC ....... H04W 12/0013; H04W 12/00503; H04W 12/06; H04W 4/021; H04W 4/025; H04W 4/08; H04W 4/10; H04W 64/003; H04W 72/121
USPC ....... 455/457, 456.1, 404.2, 575.2, 518, 411, 455/412.1, 456.3, 45, 6.1, 4, 56.1, 420, 455/519; 379/37; 709/224
See application file for complete search history.

(56) References Cited

U.S. PATENT DOCUMENTS

| | | | | |
|---|---|---|---|---|
| 7,233,815 B2* | 6/2007 | Tabata et al. | ............... | 455/575.2 |
| 7,353,034 B2* | 4/2008 | Haney | ..................... | H04W 4/21 |
| | | | | 455/457 |
| 7,412,226 B2* | 8/2008 | Kayzar et al. | ............. | 455/404.2 |
| 7,908,311 B2* | 3/2011 | O'Loughlin | ........... | G06Q 10/06 |
| | | | | 709/201 |
| 8,385,964 B2* | 2/2013 | Haney | ..................... | H04W 4/21 |
| | | | | 455/519 |
| 2002/0082068 A1* | 6/2002 | Singhal | ............................. | 463/9 |
| 2004/0056775 A1* | 3/2004 | Crookham et al. | ........... | 340/825 |

(Continued)

OTHER PUBLICATIONS

TSH Software House, based in Manchester, United Kingdom, sells a spy software package for GSM phones, website http://www.thespyphone.com/.

*Primary Examiner* — Joseph Arevalo
(74) *Attorney, Agent, or Firm* — Davidson Berquist Jackson & Gowdey, LLP

(57) ABSTRACT

A system of tracking location and movement of geographically dispersed entities with a cell phone with a GPS function, has a slave agent operable in the phone that collects location data from the GPS function and periodically sends a time and location data record to a master cell phone using prior art wireless network. The master cell phone has a master agent operable in the master cell phone that receives and saves the location data record, and plots and displays a location plot of each of the entity, enabling the master cell phone to track and display location and movement data of a plurality of entity cell phones that are geographically dispersed. The system requires the entity phone to be attached to or in possession of each of the entities.

15 Claims, 5 Drawing Sheets

(56) References Cited

U.S. PATENT DOCUMENTS

| | | | |
|---|---|---|---|
| 2005/0085242 A1* | 4/2005 | Nishizawa | 455/456.1 |
| 2005/0288036 A1* | 12/2005 | Brewer et al. | 455/456.2 |
| 2006/0003777 A1* | 1/2006 | Nonoyama et al. | 455/457 |
| 2006/0199612 A1* | 9/2006 | Beyer | H04M 1/72547 |
| | | | 455/556.2 |
| 2006/0223518 A1* | 10/2006 | Haney | H04W 4/21 |
| | | | 455/420 |
| 2008/0132243 A1* | 6/2008 | Spalink et al. | 455/456.1 |
| 2008/0146251 A1* | 6/2008 | Meadows et al. | 455/456.5 |
| 2008/0220728 A1* | 9/2008 | Seo | 455/90.2 |
| 2008/0227473 A1* | 9/2008 | Haney | H04W 4/21 |
| | | | 455/457 |
| 2009/0037569 A1* | 2/2009 | O'Loughlin | G06Q 10/06 |
| | | | 709/224 |
| 2009/0088182 A1* | 4/2009 | Piersol et al. | 455/456.1 |
| 2009/0088183 A1* | 4/2009 | Piersol et al. | 455/456.1 |
| 2009/0298513 A1* | 12/2009 | Hampel | H04W 4/021 |
| | | | 455/456.1 |
| 2010/0113065 A1* | 5/2010 | Narayan et al. | 455/456.3 |
| 2011/0275388 A1* | 11/2011 | Haney | H04W 4/21 |
| | | | 455/456.3 |
| 2012/0071129 A1* | 3/2012 | Haney | H04W 4/21 |
| | | | 455/404.2 |
| 2015/0319297 A1* | 11/2015 | Beyer, Jr. | H04W 12/08 |
| | | | 455/456.6 |

* cited by examiner

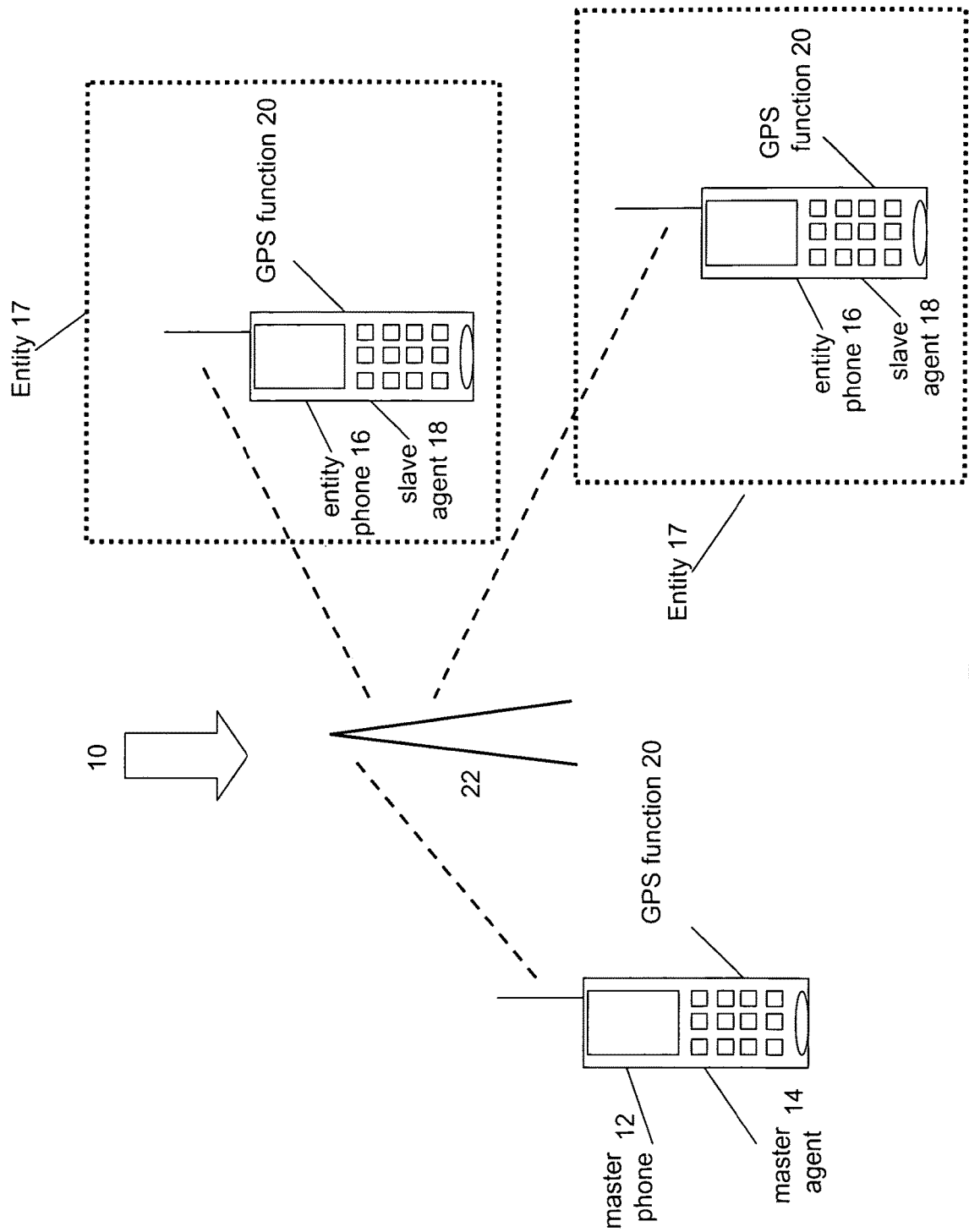

User Interface function 82
> Load Application
> Setup Features 84

Define a group: 84A
        > Name: Group A
        > Members
            > Sam 310 445 4457
            > John 214 234 4487

Tracking Features: 84B
        > On Demand
        > Periodic
            > every 1, 10, 30, 60, 1, 10, 100 minutes Plot/Display Selection: 84C
        > Distance
        > map
        > City/landmark Define a group: 85
        > name: Group B
        > members:
            > Vehicle ID, 310 334 5566
            > Vehicle ID, 334 223, 3345

> Delete a group 84D
    > Edit a Group 84E

> Function keys: 86
    > Select Group 86A
    > Display Location only 86B
    > Display Movement only 86C
    > Display Both 86D
    > Disable/Stop 86E
    > Activate 86F

Figure 4

| | |
|---|---|
| Loading master agent in the master phone | 60 |
| Loading slave agent in the GPS phone | 62 |
| Turning on/off the slave agent | 64 |
| Sending location data by slave agent to master phone | 66 |
| Plotting and displaying location data of GPS phone | 68 |
| Suppressing messages when no change in location | 70 |
| Sending a location query to the slave agent 18 | 72 |
| Receive Command and Data from master agent | 74 |
| Specifying boundary in the master agent | 76 |
| Generating Alarm when boundary crossed | 78 |
| Mutually authenticating each agent | 80 |

Figure 5

SYSTEMS AND METHODS FOR LOCATION AND MOVEMENT TRACKING USING GPS ENABLED CELL PHONES

CROSS REFERENCE TO RELATED APPLICATIONS

This application claims priority on Provisional Application Ser. No. 61/137,038, entitled "Systems And Methods For Location And Movement Tracking Using GPS Enabled Cell Phones" filed on Jul. 26, 2008, by Tara Chand Singhal. The contents of Provisional Application Ser. No. 61/137,038 are incorporated herein by reference.

FIELD OF THE INVENTION

The preferred embodiment is on systems and methods for a location and movement tracking system using GPS enabled cell phones

BACKGROUND

A location and movement tracking system as in tracking a fleet of vehicles is a useful application. However, such systems are costly as they may use specialized hardware and software.

It is an objective of the preferred embodiment to have a cheaper and easier to set up location and movement tracking system so they can be more widely used in many more applications that have hitherto have not used location and movement tracking systems.

SUMMARY

A system that tracks location and movement of geographically dispersed entities, each equipped with a cell phone with a GPS function is described. In this system each entity's cell phone has a slave agent operable in the entity phone that periodically collects location data from the GPS function and periodically sends a time and location data record to a master cell phone using currently utilized or future developed wireless network.

These currently utilized or future developed wireless networks are global in scope and enable a cell phone anywhere to communicate with another cell phone anywhere else on the globe. Just like the use of CCD based camera that is being incorporated in almost all cell phones by their manufacturers, the small size and low power requirements of GPS integrated chips that integrate the radio and location functions and that are specifically designed for cell phone applications make the use of GPS function in the cell phones widely popular. The declining cost and cost of use of cell phones as well as the wireless network is a factor that makes this system of location and movement tracking highly cost effective than prior art systems for location and movement tracking.

In this system, the master cell phone has a master agent operable in the master cell phone that receives and saves the location data record from each of the entity phones and plots and displays a location plot of each of the entity, enabling the master cell phone to track and display location and movement data of a plurality of entity cell phones that are geographically dispersed. Alternatively, or in addition, the master agent may send a location query to the slave agent and the slave agent on demand responds with the entity phone location from the GPS function.

Alternatively, each of the phones, in a group of phones may have a master and slave agent features, enabling each phone to track each other on demand or track each other periodically by default. The system requires the entity phone to be attached to or to be in possession of each of the entities. The entities could be humans, vehicles or other mobile platforms such as shipped or moving goods. In some embodiments, there may be a help and a push to talk function keys in the entity phones enabling the entity phones in the possession of humans to communicate with the master phone.

Such a system would be cost efficient than prior art systems for location and movement tracking and would be easier to set up, requiring only loading in software agents from the Internet to cell phones, and thus would widely be available and cost effective to use, enabling such a system to be used in old applications as well as in many more new that hitherto have not needed or desired a location and movement tracking system.

The system may be used for applications such as: parents monitoring their children in a park, in school, traveling to and from to school, extended activity away from home, or in a public area such as shopping center and amusement park, monitoring aged parents. In other applications, scout master monitoring scouts on a hiking trips in wilderness, ranger station monitoring hikers, where the master phone is at a base station.

In yet other applications, a base station may monitor a vehicle fleet, unmanned vehicles such as exploration robots, and flying planes, and goods in transit and in storage. In yet another application, the system may be used for electronic monitoring of people under court order, where the entity phone being monitored is enclosed in an electronic monitoring jacket attached to a person. In such applications, the entity phone may have a long life battery. There may be yet more applications that are not identified here.

BRIEF DESCRIPTION OF THE DRAWINGS

Some of the novel features of this preferred embodiment will be best understood from the accompanying drawings, taken in conjunction with the accompanying description, in which similar reference characters refer to similar parts, and in which:

FIG. 1 is a block diagram that illustrates features of the present preferred embodiment of location and movement tracking system;

FIG. 4 is a block diagram that illustrates features of the present preferred embodiment of the user interface;

FIG. 5 is a method diagram that illustrates features of the present preferred embodiment of using location and movement tracking system.

DESCRIPTION

Figures 2A, 2B:
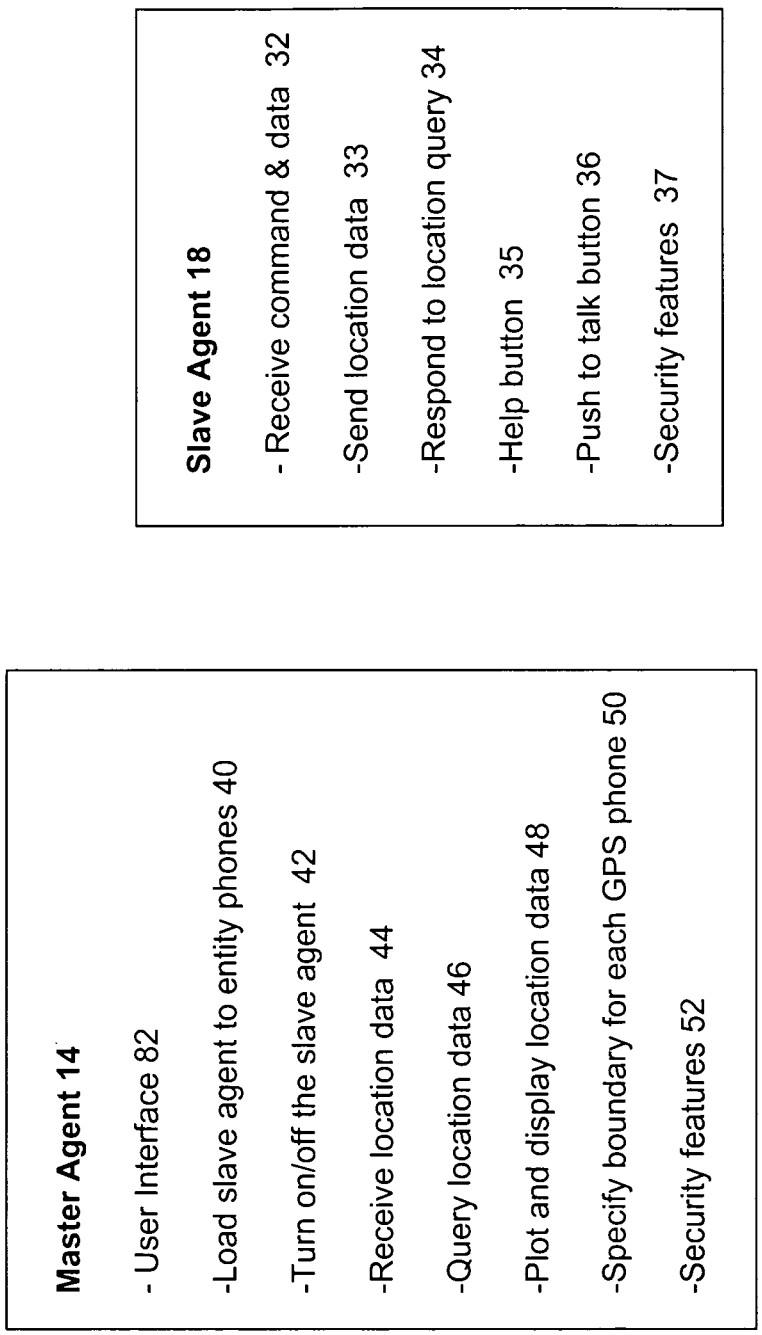
FIG. 2A is a block diagram that illustrates features of the present preferred embodiment of the master agent in the cell phones.
FIG. 2B is a block diagram that illustrates features of the present preferred embodiment of the slave agent in the cell phones.

As illustrated in FIG. 1, a system 10 of tracking location and movement of geographically dispersed entities 17, with a cell phone 16 with a GPS function 20, has a slave agent 18 operable in the phone 16 that collects location data from the GPS function 20 and periodically sends a time and location data record to a master cell phone 12 using currently utilized or future developed wireless network 22. The entity 17 may be human, goods, and vehicle.

The master cell phone 12 has a master agent 14 operable in the master cell phone 12 that receives and saves the location data record, and plots and displays a location plot of each of the entity, enabling the master cell phone 12 to track and display location and movement data of a one or more of entity 17 with cell phones 16, that are geographically dispersed, when the entity phone 16 to be attached to or in possession of each of the entities 17.

Alternatively, the master agent 14 may send a location query to the slave agent 18 and the slave agent 18 on demand responds with the entity phone location from the GPS function 20.

The system 10 may be used for applications from a group that include, (i) parents monitoring their children in a park, in school, traveling to and from to school, extended activity away from home, or in a public area such as shopping center and amusement park, monitoring aged parents, (ii) scout master monitoring scouts on a hiking trips in wilderness, ranger station monitoring hikers, where the master phone is at base station, (iii) base station monitoring a vehicle fleet, base station monitoring unmanned vehicles such as exploration robots, monitoring goods in transit and in storage, and (iv) electronic monitoring of people under court order, where the GPS phone is enclosed in an electronic monitoring jacket.

Also, each of the entity phones 16 may have both a master and a slave agent features, enabling each phone to track each other on demand or periodically by default.

The slave agent 18 and the master agent 14 have a currently utilized or future developed security features for mutual authentication and encryption of data. The interface between the master agent 14 and the slave agent 18 may be via any number of currently utilized or future developed protocols, such as short messaging system (SMS).

The slave agent 18 in the entity phone 16 suppresses sending location message records, when there is no change in location from the previous location message record sent to the master cell phone 12.

The slave agent 18 in the entity phone 16 sends the phone id as part of the SMS message that may include the assigned phone number and the SIM ID.

The slave agent 18 in the entity phone 16 suppresses creation of records of SMS messages in the entity phone 16, so as not to have record of such messages clog the list of messages that are sent and received by the entity phone, as normal usage of the phone features.

The slave agent 18 in the entity phone 16 has currently utilized or future developed techniques to receive commands and data from the master agent 14 in the master cell phone 12. Such commands and data may be used for any number of purposes such as, request status and update of the slave agent software.

The slave agent 18 in the entity phone 16 have the currently utilized or future developed techniques to uniquely identify, verify, and authorize the commands and data from the master agent 14 in the master cell phone 12 via encryption and remote user authentication and digital signature techniques. The master agent in the master phone also have the currently utilized or future developed techniques to uniquely identify, and verify and authorize the location data as having come from a specific slave agent 18 in a specific entity cell phone 16.

The master agent 14 in the master cell phone 12 is equipped to send a message to the slave agent 18 in the entity cell phone 16 to turn on/off sending location feature in the slave agent 18 in the entity cell phone 16.

The master agent 14 in the master phone 12 may have currently utilized or future developed techniques to specify a geographic boundary for each of the entities, and when the entity crosses the boundary to generate an alarm in the master phone 12. Alternatively, or in addition when the entity crosses the boundary to call the entity phone 16 with an advisory warning. The boundary may be specified in distance from a known location such as 100 yards, 500 yards, 1000 yards, and 1 mile from the specified location or it may be specified in latitude and longitude values.

The master agent 14 may be loaded to the master phone 12 from an internet server. The master agent 14 then may be loaded wirelessly into the slave agent 18 in each of the entity phones 16. Other methods of loading that are currently utilized or may be utilized in the future may be used as well.

As illustrated in FIG. 2A, the master agent 14, has the functions of, user interface 82, load slave agent to entity phones 40, turn on/off the slave agent 42, receive location data 44, query location data 46, plot and display location data 48, specify boundary 50 for each entity phone, and security features 52. The user interface function is described later with reference to FIG. 4.

As illustrated in FIG. 2B, the slave agent 18 has the functions of, receive command and data 32, send location data 33, respond to location query 34, help button function 35, and push to talk button function 36, and security features function 37. The help button function 35 may send a pre-specified SMS message to the master cell phone, identifying the nature of the help needed. The push to talk button function may dial out and create a voice connection to the master cell phone.

The security features 52 in the master agent 14 and security features 37 in the slave agent 18 mutually authenticate and encrypt traffic between the slave agent 18 and the master agent 14.

The mobile wireless device and cell phones are general purpose computing devices with CPU, memory and non-volatile storage and are thus software-based devices, where the software controls all aspects of operation of all functions in the device. As an illustration, of the ability of the embedded software to control and provide and overlay many different functions in a cell phone, a company called TSH Software House, based in Manchester, United Kingdom, sells a spy software package for GSM phones, that has access to phone's core features, enabling the spy software to intercept calls, intercept SMS, track the device, does not require any active internet connections, works in any country, among many other features and is advertised on their website http://www.thespyphone.com/.

Therefore, the technology itself for programming the master agent 14 and the slave agent 18 is prior art.

A means of tracking location and movement of geographically dispersed entities, has a GPS enabled cell phone with a GPS function means, that has a slave agent means that collects location data from the GPS function and periodically sends a time and location data record via SMS protocol to a master cell phone; and the master cell phone has a master agent means that receives and saves the location data record, and plots and displays a location plot of each of the entity, enabling the master cell phone to track and display location and movement data of a plurality of GPS enabled cell phones, that are geographically dispersed.

There may be currently utilized or future developed means for specifying a boundary in the master agent in the master phone, for each of the entity. When the entity crosses the boundary, there is an alarm generating means in the master phone. Alternatively, when the entity crosses the boundary, the master agent communicates with the entity phone for an advisory warning.

A means for loading the master agent to a master phone from an internet server, the master agent means then loading the slave agent in each of the GPS phones wirelessly.

Figure 3:
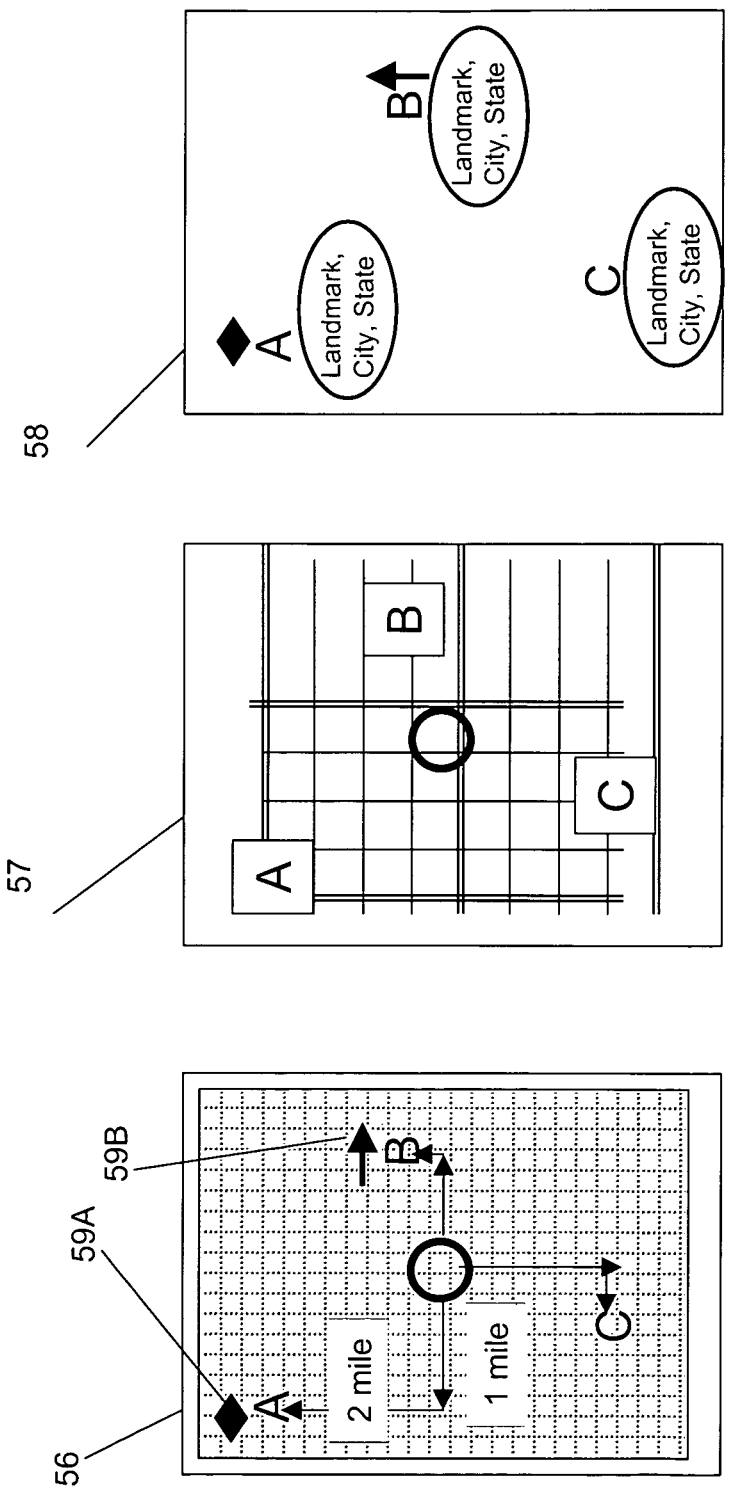
FIG. 3 is a block diagram that illustrates features of the present preferred embodiment of the display in the master cell phones.

As illustrated in FIG. 3, the location and movement data may be displayed on the screen of the master cell phone 12 using a distance chart 56, if the entities are in close geographic location. It may be displayed as a street map using map features 57. It may also be displayed via a geography map 58, if they are dispersed in a wide area across states or cities. The display may have currently utilized or future developed techniques to show entities that are in different states or different countries, by mapping their GPS location to cities, and landmarks within those cities 58. A GPS location in lat/long to map location or landmark location technology is prior art.

The display software technology for such display features is prior art. In addition, as illustrated in the FIG. 3, in the display, a diamond symbol 59A next to an entity on the display may be used to indicate the entity is stopped or in motion by different symbol 59B, such as an arrow denoting movement. The entities may be identified on the displays by their names that have been assigned in the user interface function 82, as described with reference to FIG. 4 later.

As illustrated in FIG. 4, the master agent provides a user interface 82. The user interface 82 has a setup function 84, with set up features of, define group 84A, define tracking 84B and define display 84C.

In defining a group 84A, a group name and members of the group are defined. Each member in the group is identified by a name and a cell telephone number. The name is used for display. In defining tracking features 84B, the choice between tracking on demand and tracking periodically is selected. If tracking periodically is selected, then the frequency of tracking such as, every ten seconds, 30, 60 seconds or 1, 10, or 100 minutes may be selected. The period may default to one minute, if not selected. In defining display selection, the choices between distance 56, local map 57 or city state 58 may be selected. An alternative group format 85 may define group members by vehicle id and a telephone number. Additional functions of delete a Group 84D and edit a group 84E may be used.

Function keys 86 help facilitate the use of the system and may be set up where a function key for selecting a group for tracking 86A may be selected, a display format change key 86B, 86C and 86D between the display choices may be used. Additional function keys for disabling/stopping the feature 86E and activating the feature 86F may be used.

As illustrated in FIG. 5, the method steps are defined below. Not all steps may be used or used in the order specified.

At step 60, loading the master agent 14, from an internet server and adapting the master cell phone with a master agent 14 operable in the master cell phone 12.

At step 62, loading slave agent 18 in the entity phone 18 from the master agent 14 and adapting, an entity cell phone, with a slave agent 18.

At step 64, the master agent 14, turning on/off the slave agent 18 and attaching the entity phone or giving for possession to each entity. Sending a message by the master agent in the master cell phone to the slave agent in the GPS cell phone to turn on/off location feature in each GPS enabled cell phone.

At step 66, the slave agent 18 sending location data to the master phone 12. The slave agent 18 operable in the phone, the agent collecting location data from the GPS function 20 and periodically sending a time and location data record to a master cell phone 12.

At step 68, the master agent 14 receiving and saving the location data record, and plotting and displaying a location plot of each of the entity, enabling the master cell phone to track and display location and movement data of a plurality of GPS enabled cell phones, that are geographically dispersed.

At step 70, the master agent 14, sending a location query to the slave agent 18 and the slave agent responding with the entity phone location from the GPS function.

At step 72, suppressing sending location messages by the agent 18 in the entity phone 16, when there is no change in location from the previous location message.

At step 74, receiving commands and data by the slave agent 18 in the entity phone 16 from the master agent 14 in the master cell phone 12.

At step 76, the master agent 14 specifies boundary in the master agent in the master phone, for each of the entity.

At step 78, generating alarm when boundary crossed, and when the entity crosses the boundary to generating an alarm in the master phone and or when the entity crossing the boundary, communicating with the entity phone 16 for an advisory warning.

At step 80, uniquely identifying, verifying and authorizing the commands and data by the slave agent in the entity phone from the master agent in the master cell phone, and the master agent in the master phone, has currently utilized or future developed techniques to uniquely identify, and verify and authorize the location data from the slave agent in the master cell phone.

In summary, the preferred embodiment provides a cheaper and easier to set up software only location and movement tracking system that does not require any hardware and uses features of cell phones that are already owned by a large sections of people.

While the particular preferred embodiment, as illustrated herein and disclosed in detail is fully capable of obtaining the objective and providing the advantages herein before stated, it is to be understood that it is merely illustrative of the presently preferred embodiments and that no limitations are intended to the details of construction or design herein shown other than as described in the appended claims.

What is claimed is:

1. A system of tracking location and movement of a plurality of geographically dispersed entities, comprising:
   a group of cell phones, wherein each cell phone in the group has a CPU, a memory, a storage and a GPS function and operating in a wireless network with SMS messaging functionality, wherein the GPS function provides a location data to each of the cell phones in the group;
   the group of cell phones, wherein, each cell phone is assigned an operational role as either a slave cell phone or a master cell phone, wherein, in the group of cell phones, there are a plurality of slave phones and a single master cell phone;
   the plurality of slave cell phones are in the possession of the plurality of geographically dispersed entities and the master cell phone is in the possession of an another geographically dispersed entity which monitors the location of the plurality of geographical dispersed entities;

each of the plurality of slave cell phones, has a slave agent stored in the memory and operating in the CPU and the master cell phone has a master agent stored in the memory and operating in the master cell phone, wherein the slave agent identify and verify commands and data from the master agent in the master cell phone and the master agent in the master cell phone, identifies and verifies the location data as having come from the plurality of slave agent in the plurality of slave cell phones;

each of the slave agent in the slave cell phone from the plurality of slave phones collects the slave cell phone's location data from the GPS function in the slave cell phone and sends exclusively periodically the short messaging system (SMS) message via a predefined message format including a time and a location data record of the slave cell phone to the master cell phone;

the slave phone agent suppresses sending location message records, when there has been no change in location of the slave phone from the previous location message record sent to the master cell phone;

the master agent stored and operating in the master cell phone, receives and saves the location data record received from the slave cell phone in the memory of the master cell phone and plots, tracks and displays location and movement data of the plurality of geographically dispersed entities with the plurality of slave cell phones;

the system is used for applications from a group that includes, parents monitoring their children traveling to and from to school and extended activity away from home, and scout master monitoring scouts on hiking trips.

2. The system as in claim 1, the slave cell phone includes:
(a) a help key function in the slave cell phone activated by pressing the help key on the slave cell phone sending out a SMS message with a pre-defined help message to the master cell phone;
(b) a push to talk key function in the slave cell phone activated by pressing the talk key dialing out a connection to the master cell phone.

3. The system as in claim 1, further comprising:
the master agent sends a location query to the slave agent and the slave agent responds with the slave phone location from the GPS function.

4. The system as in claim 1, further comprising:
the master agent in the master cell phone sends command and data messages to the slave agent in the slave cell phone to include turn on/off sending location feature in the slave agent in the slave cell phone, and the slave agent in the slave phone receives commands and data from the master agent in the master cell phone.

5. The system as in claim 1, further comprising:
the slave agent in the slave cell phone uniquely identifies, verifies, and authorizes the commands and data from the master agent in the master cell phone via encryption and remote user authentication and digital signature techniques and the master agent in the master phone, uniquely identifies, and verifies and authorizes the location data as having come from the slave agent in the slave cell phone.

6. The system as in claim 1, further comprising:
the master agent in the master phone specifies a geographic boundary for each of the entities with a slave phone, and when the entity crosses the geographic boundary generating an advisory alarm in the master phone.

7. The system as in claim 1, further comprising:
a user interface in the master agent enables setup features of the system to be specified to include, entity names and the groups they belong, tracking on demand or periodically, and choices of display between map, distance and geography.

8. The system as in claim 1, further comprising:
the master agent enables automatic display of location and movement by a display in distance, display by street map and display by geography features.

9. A method of tracking location and movement of a plurality of geographically dispersed entities, comprising the steps of:

providing a group of cell phones, wherein each cell phone in the group has a CPU, a memory, a storage and a GPS function and operating in a wireless network with SMS messaging functionality, wherein the GPS function provides a location data to each of the cell phones in the group;

assigning to each cell phone, in the group of cell phones, an operational role as either a slave cell phone or a master cell phone, wherein, in the group of cell phones, there are a plurality of slave phones and a single master cell phone;

providing the plurality of slave cell phones in the possession of the plurality of geographically dispersed entities and the master cell phone is in the possession of an another geographically dispersed entity which monitors the location of the plurality of geographical dispersed entities;

providing in each of the plurality of slave cell phones, a slave agent stored in the memory and operating in the CPU and providing in the master cell phone a master agent stored in the memory and operating in the master cell phone, wherein identifying and verifying by the slave agent commands and data from the master agent in the master cell phone and identifying and verifying by the master agent in the master cell phone, the location data as having come from the plurality of slave agent in the plurality of slave cell phones;

collecting by each of the slave agent in the slave cell phone from the plurality of slave phones, the slave cell phone's location data from the GPS function in the slave cell phone and sending exclusively periodically the short messaging system (SMS) message via a predefined message format including a time and a location data record of the slave cell phone to the master cell phone;

suppressing sending location message records by the slave phone agent, when there has been no change in location of the slave phone from the previous location message record sent to the master cell phone;

receiving and saving by the master agent, stored and operating in the master cell phone, the location data record received from the slave cell phone in the memory of the master cell phone and plots, tracks and displays location and movement data of the plurality of geographically dispersed entities with the plurality of slave cell phones; the system is used for applications from a group that includes, parents monitoring their children traveling to and from to school and extended activity away from home, and scout master monitoring scouts on hiking trips.

10. The method as in claim 9, further comprising the steps of:
sending a location query by the master agent to the slave agent and the slave agent responding with the slave phone location from the GPS function.

11. The method as in claim 9, further comprising the steps of:

sending command and data including a message by the master agent in the master cell phone to the slave agent in the cell phone to turn on/off location feature in each of the slave cell phones.

12. The method as in claim 9, further comprising the steps of:

(a) identifying, verifying and authorizing commands and data by the slave agent in the slave phone from the master agent in the master cell phone;

(b) identifying, verifying and authorizing by the master agent in the master phone the location data as having come from the slave agent in the slave cell phone.

13. The method as in claim 9, further comprising the steps of:

specifying a boundary by the master agent in the master phone, for each of the entities, and when an entity crosses the geographic boundary generating an alarm in the master phone.

14. The method as in claim 9, further comprising the steps of:

loading the master agent to a master phone from an internet server, the master agent then wirelessly loading the slave agent in each of the slave cell phones.

15. The system as in claim 1, comprising:

the master cell phone tracks and displays location and movement data of a one or more of entities each with a slave phone that are geographically dispersed enabling the system used for applications from a group that includes, ranger station monitoring hikers, where the master phone is at base station, a base station monitoring a vehicle fleet, unmanned vehicles including exploration robots, and monitoring goods in transit and in storage, and electronic monitoring of people under court order, where the slave phone is enclosed in an electronic monitoring jacket.

* * * * *